Jan. 2, 1968  J. E. HALVERSON  3,360,817
EGG CLEANING MACHINE
Filed Jan. 20, 1966  9 Sheets-Sheet 1

INVENTOR.
JAMES E. HALVERSON
BY
Caswell Lagaard + Wicks
ATTORNEYS

Jan. 2, 1968     J. E. HALVERSON     3,360,817

EGG CLEANING MACHINE

Filed Jan. 20, 1966     9 Sheets-Sheet 4

INVENTOR.
JAMES E. HALVERSON
BY
*Caswell Lagaard & Wicks*
ATTORNEYS

FIG. 6

INVENTOR.
JAMES E. HALVERSON
BY
Caswell Lagaard & Wicks
ATTORNEYS

Jan. 2, 1968  J. E. HALVERSON  3,360,817
EGG CLEANING MACHINE
Filed Jan. 20, 1966  9 Sheets-Sheet 7

INVENTOR.
JAMES E. HALVERSON
BY
Caswell Lagaard & Wicks
ATTORNEYS

FIG. 23

INVENTOR.
JAMES E HALVERSON
BY
Caswell Lagaard & Wicks
ATTORNEYS 3,360,817
EGG CLEANING MACHINE
James E. Halverson, Box 55, Dallas, Wis. 54733
Filed Jan. 20, 1966, Ser. No. 521,894
20 Claims. (Cl. 15—3.13)

ABSTRACT OF THE DISCLOSURE

An egg cleaning machine having a conveyor for rolling eggs along a number of fixed guides, a receiving device for receiving eggs with their axes vertical, an arranging device for shifting the egg from vertical positions to horizontal positions with the axis of the eggs transverse to the conveyor and guides, washing means including cloths adapted to engage the eggs as they travel along the guides and overhead sprays spraying water and detergent from water tank upon the eggs as they travel upon the guides and upon the cloths, rinsing means rinsing the eggs after washing while on said guides, drying means for drying the eggs while on said guides and means for discharging the cleaned eggs from said guides.

---

The herein disclosed invention relates to egg cleaning machines and has for an object to provide a machine by means of which the eggs may be thoroughly washed, rinsed and dried.

Another object of the invention resides in providing a machine in which breakage of the eggs is prevented as the eggs travel through the machine.

An object of the invention resides in providing supporting means for the various parts of the machine, including a housing provided with a lower section having a central portion an inlet extension and an outlet extension and a cover therefor.

An object of the invention resides in providing an egg receiving device which receives the eggs in the vertical positions in which they are disposed in the egg cases.

Another object of the invention resides in providing an arranging device in which the eggs are shifted from a vertical position to a horizontal position on guide means on which the eggs roll about their longitudinal axes while being cleansed.

Another object of the invention resides in providing washing apparatus including a construction in which the eggs are individually sprayed successively by means of a plurality of spray nozzles arranged in the path of movement of the eggs.

An object of the invention resides in providnig a number of washing clothes suspended between the spray nozzles and the eggs, these cloths being wrapped about the eggs and so held by the water from the spray nozzles while the eggs pass beneath the same.

An object of the invention resides in providing a recirculating system for recirculating both the water used for scouring and rinsing the eggs whereby economy in the cleaning of the eggs is accomplished, and in providing water supply means therefor.

Another object of the invention resides in removing the water from the washing section from the upper surface thereof.

An object of the invention resides in providing a rinsing section for removing the washing water therefrom.

A still further object of the invention resides in discharging the surplus water from the rinsing section from the upper surface thereof and to the water in the washing section.

An objection of the invention resides in heating the water in both the washing and rinsing sections of the machine.

Another object of the invention resides in disposing the washing and rinsing apparatus as well as the water circulating means, water tanks and heaters in the central portion of the lower section of the housing, the feed device and egg arranging device in the forward extension of the same and the drying apparatus and discharge device in the other extensions of the lower section and in further disposing the water sprays in the cover.

A still further object of the invention resides in providing a conveyor running through all three portions of the housing for conveying the eggs from the egg receiving device to the discharge device.

A feature of the invention resides in providing detergent mixing means for automatically adding detergent to the water used, and for periodically adding the mixture to the water used.

Another object of the invention resides in flushing the bottom of the tanks by water injected periodically at the bottom of the tank in the form of flat sprays.

An object of the invention resides in constructing the drying means with a fan drawing air from the room and from the heating means through the spaces adjoining the eggs and discharging the moisture laden air outwardly of the room in which the machine is installed.

Another object of the invention resides in the construction by means of which the machine can be disassembled for the purpose of cleaning and repair.

Other objects of the invention reside in the novel combination and arrangement of parts and in the details of construction hereinafter illustrated and/or described.

The invention covered by this application for patent comprises a housing A in which the apparatus for washing and drying the eggs is contained or with which it is associated and which serves as supporting means for the various parts of the machine. In the machine disclosed two runs B and C are shown which are substantially identical in form. Due to the similarity of the same only the run B will be described, the same reference numerals for the identical parts being used for both runs. Both runs B and C utilize a conveyor D extending throughout the length and width of the machine and by means of which the eggs to be cleaned are conveyed. Eggs packed in standard egg cases containing 36 eggs to the layer may be picked up, a layer at a time by suction apparatus now available but not shown and deposited as a unit on an egg receiving device E of the machine with the longitudinal axes of the eggs vertical. Following the egg receiving device E is an egg arranging apparatus F in which the eggs are rearranged with the longitudinal axes horizontal and deposited upon elongated guide means Q transversely of the same. The eggs are conveyed by the conveyor D and pass through a water washing apparatus G where they are washed and scrubbed. Water circulating means H delivers water to the washing apparatus and heating means I heats the water to the proper temperature. Detergent is mixed with water by means of mixing apparatus J. Upon leaving the washing apparatus the eggs pass through a rinsing apparatus K where the washing water is removed. Dirty water is removed from the machine by means of drainage apparatus L. From the rinsing apparatus K the eggs are dryed in drying apparatus M and removed from the conveyor by a discharge device N. A transmission O procures operation of the conveyor D and an electrical system P energizes the various motors and switches of the invention and controls the operation of the machine.

Housing A

Figure 1:
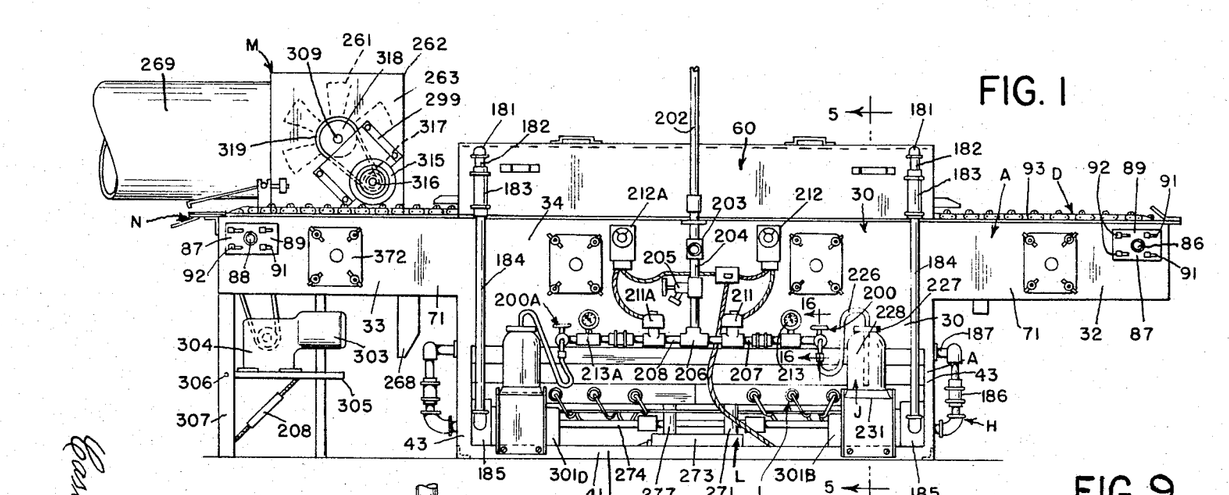
FIG. 1 is a side elevation view of an embodiment of the invention and taken from the left-hand side thereof as viewed from the front of the invention.
Figure 2:
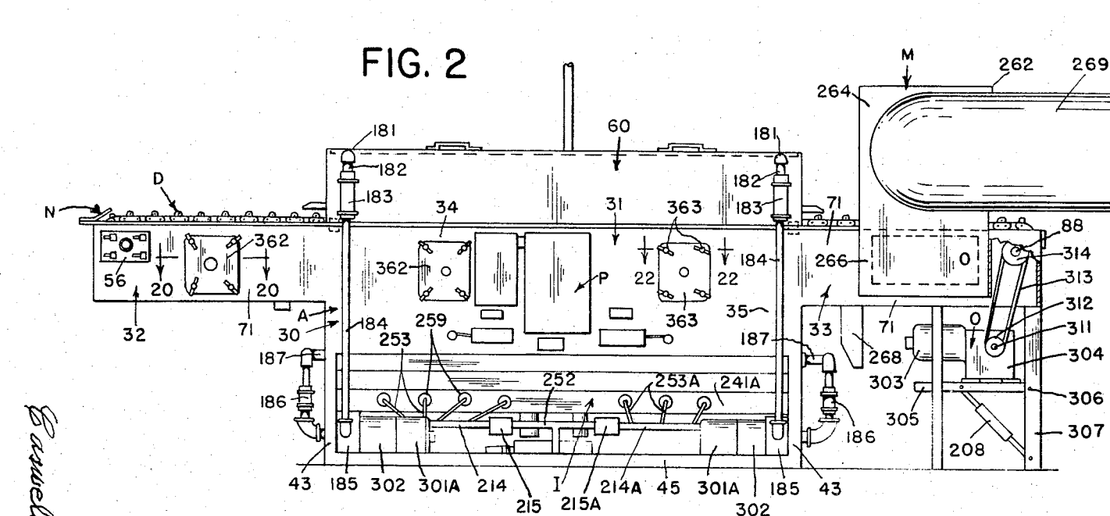
FIG. 2 is a view similar to FIG. 1 and viewed from the right-hand side of the machine.

The housing A is constructed with a lower section 30 having a central portion 31, a front extension 32 and a rear extension 33. The central portion 31 is provided with walls, 34, 35, 36 and 37. These walls are constructed of steel welded together. The walls 34 and 35 are constructed from single plates while the walls 36 and 37 are each constructed with two spaced transverse plates 38 and 39 to provide an opening 41 therebetween. The walls 34, 35, 36 and 37 are welded to a hopper shaped bottom 42. Legs 43 are welded to the corners of the walls 34, 35, 36 and 37 as best shown in FIGURES 1, 2 and 5. These legs are angular in cross section and are connected together at the lower ends of the same by means of angular frame members 44 and 45. Below the bottom 42 are two flaring plates 46, FIG. 5. A central partition 41, FIG. 4, extends across the two side plates 34 and 35, and to the bottom 42 to form two chambers 51 and 52 in the central portion 31 of housing A. This partition is constructed similar to the end walls 36 and 37 with plates 53 and 54 to form an opening 55 therein similar to the opening 41 in said end walls and registering therewith. The upper edge 56 of partition 47 lies flush with the upper edges of the end and side walls of housing A.

The upper ends of the walls 34 and 35 are formed with outwardly turned flanges 57, FIG. 5, and which are arranged in coplanar-relation. Resting on the flanges 57 is a cover 60, best shown in FIG. 5, which is constructed with side walls 61 and 62 and which have flanges 65 issuing outwardly from the lower edges thereof and resting on the flanges 57 of the central portion 30 of housing A. A top 66 is secured to the walls 61, 62, 63, and 64 of cover 60. The walls 61, 62, 63 and 64 and the top 66 are similar to the walls 34, 35, 36 and 37 and are constructed of steel plates welded together. The end walls 63 and 64 are shorter than the side walls 61 and 62 to leave openings 67 between said end walls and the end walls 36 and 37 of the central portion 31 of the lower section 30 housing A as shown in FIG. 4.

Figures 4, 8, 10, 11:
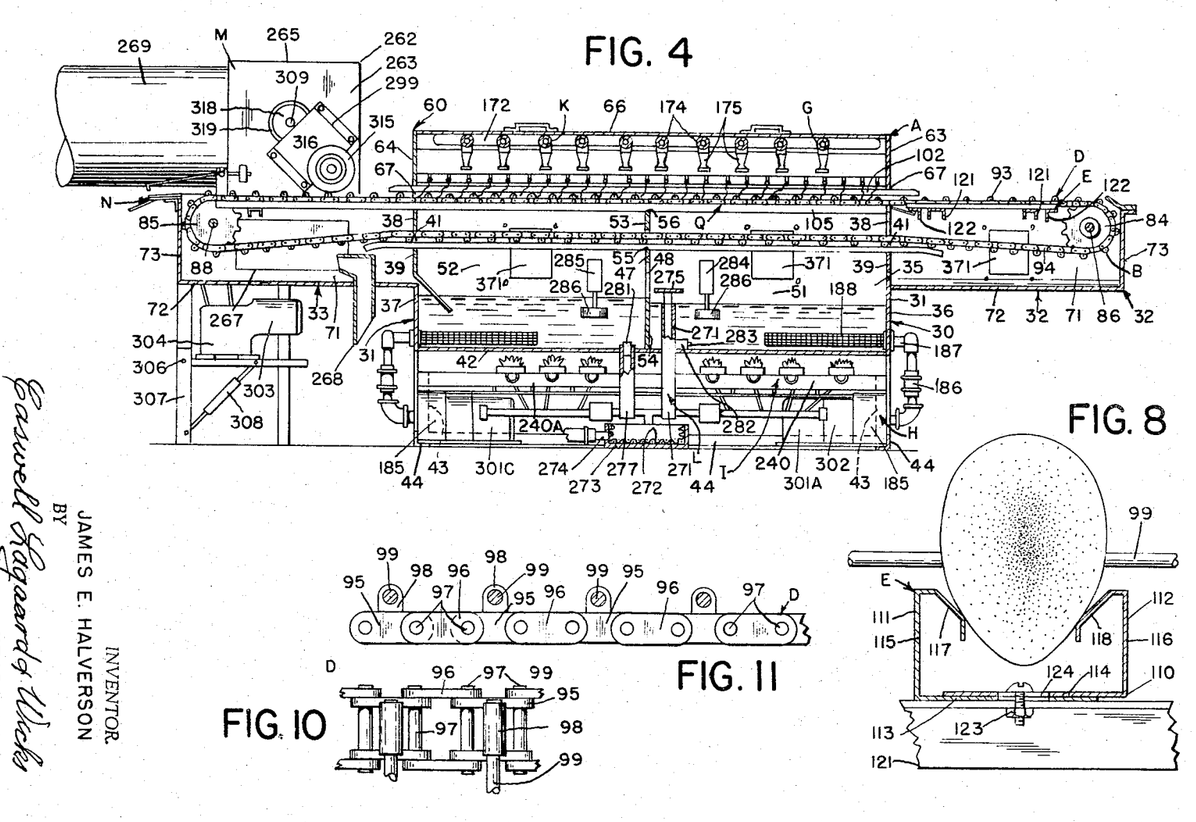
FIG. 4 is a longitudinal vertical sectional view taken on line 4—4 of FIG. 3.
FIG. 8 is a fragmentary cross-sectional view taken on line 8—8 of FIG. 6 and drawn full size.
FIG. 10 is a plan view of a portion of the chain of one of the conveyors and drawn half size.
FIG. 11 is an elevational view of the structure shown in FIG. 10.
Figure 5:
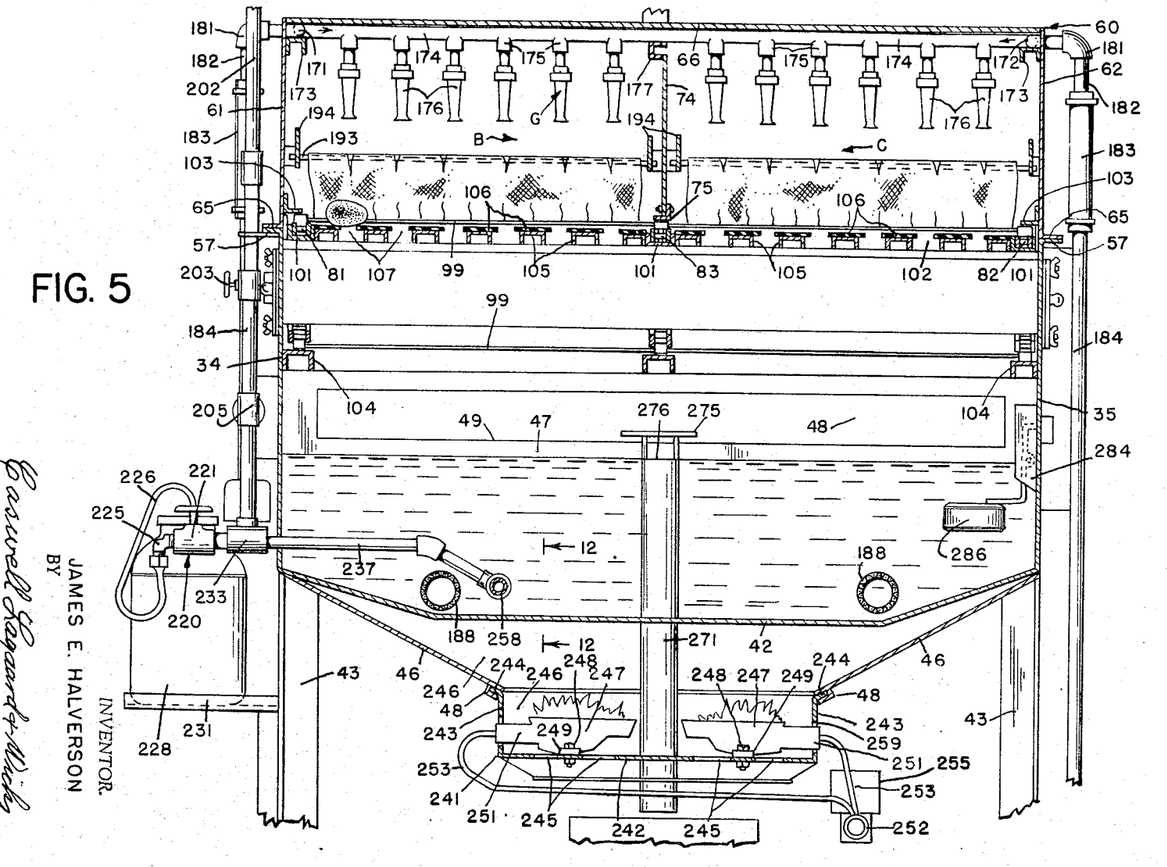
FIG. 5 is a cross sectional view taken on line 5—5 of FIG. 1.

As shown in FIG. 4 the two extensions 32 and 33 project outwardly from the walls 34 and 35 of section 30 of housing A. These extensions comprise two extended portions 71 of the walls 34 and 35, bottoms 72 and end walls 73 all welded together and forming an integral part of the central portion 31 of the section 30 of housing A. The extensions 32 and 33 and the central portion 31 are open at the top for a purpose which will presently become obvious.

In the walls 31, 32 and 71 of the housing A are provided access openings 361 by means of which inspection of the interior of the housing may be had or access to the parts therein. These openings are closed by covers 362 which overlie said openings and are secured to the walls by means of thumb screws 362.

Runs B and C

The runs B and C of the machine are separated in the cover 60 by means of a partition 74, FIG. 5, which runs lengthwise of the machine and which is secured to the end walls 63 and 64 of cover 60.

Conveyors D

The conveyors D for runs B and C consists of three endless sprocket chains 81, 82 and 83, FIG. 5, which are mounted on sprocket wheels 84 and 85, FIG. 4. The wheels 84 are attached to a shaft 86 which is journaled in bearings 87 attached to the ends of the walls 71 of the extension 31. In a similar manner sprocket wheels 85 are mounted on a shaft 88 which is journaled in bearings 87 attached to the walls 71 of extensions 33. These bearings have flanges 89 formed with slots 91 therein. Cap screws 92 extend through said slots and are screwed into the walls 71 to support the bearings for sliding movement for providing takeup for the conveyor chains 81, 82 and 83. By means of this construction each chain is provided with an upper run 93 and a lower return run 94.

The various chains 81, 82 and 83 best shown in FIGS. 10 and 11 each consist of a number of links 95 and 96 which are pivoted together by means of pins 97. Every link 95 has extended outwardly from it a lug 98 which is drilled to receive a rod 99 extending through the corresponding lugs of the chains 81, 82 and 83. As shown in FIG. 5, the upper runs 93 of the chains 81, 82 and 83 are received in U-shaped guides 101, said guides passing through openings 102 formed in the walls 36 and 37 of the section 30 of housing A and walls 63 and 64 of cover 60 and being secured to walls 36 and 37 and partition 47. Disposed above the runs 93 of the chains are angle retainers 103 which are attached to the sides 61 and 62 of the cover 60. These retainers hold the various links of the chain within the guides 101 and prevent the same from jumping up and injuring the eggs carried thereon. The return runs 94 of the chains 81, 82 and 83 are supported on inverted channel member 104 which rest on the upper edges of the plates 39 of walls 36 and 37 and the plate 54 of partition 47 and which are welded thereto.

Guide means Q

Figure 6:
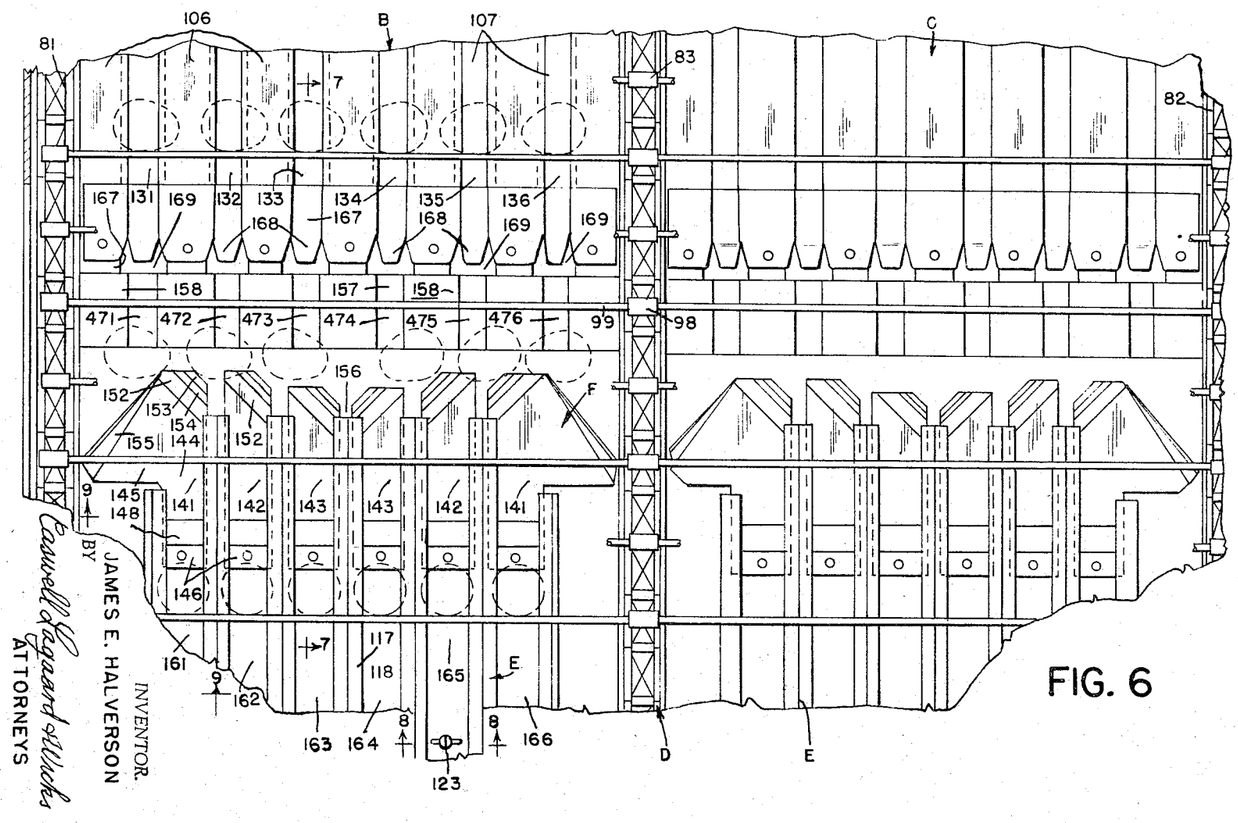
FIG. 6 is a plan view of a portion of the machine at the feed device thereof and drawn to a greater scale than FIG. 3.
Figure 7:
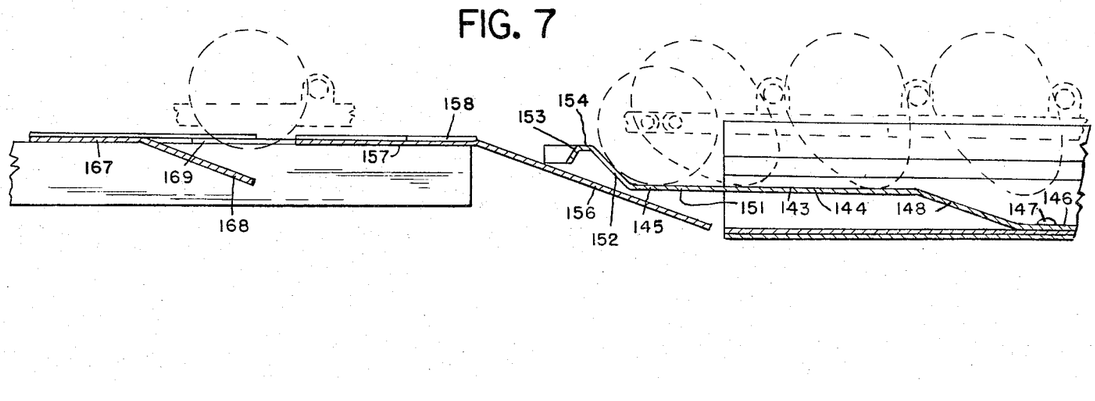
FIG. 7 is a cross-sectional view taken on line 7—7 of FIG. 6 and drawn full size.
Figure 9:
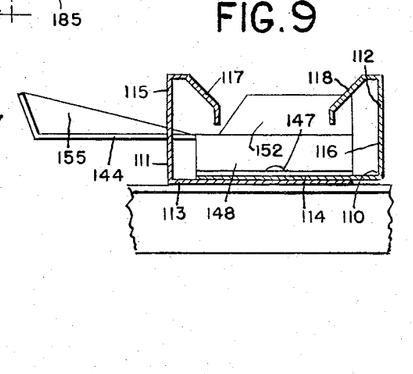
FIG. 9 is a fragmentary cross-sectional view similar to FIG. 8 taken on line 9—9 of FIG. 6.

Operating in conjunction with the conveyor D are inverted longitudinally extended laterally spaced channel members 105, FIG. 5, which support the eggs with the longitudinal axes of the eggs horizontal as contrasted with the vertical position of the axes of the eggs when being deposited on the egg receiving device E of the machine. These channel members serve as rails and have elongated pads 106 attached to the upper surfaces thereof and on which the eggs may roll when engaged by the moving rods 99 of conveyor D. These channel members extend through the openings 102 in the end walls 63 of cover 60 and the ends walls 35 and 36 of plates 37 and are secured to the upper ends of the plates 38 and 53. The rails 105 stop at the wall 35 and extends outwardly beyond the wall 36 as shown in FIG. 4. The pads 106 are constructed of rubber or some other resilient material on which the eggs ride and which prevent injury to the eggs in their passage through the machine. By means of this construction six runways 131, 132, 133, 134, 135 and 136 are formed, in each run along which the eggs roll, as shown in FIG. 6.

*Egg receiving device E*

The egg receiving device E is disposed in the extensions 32 of housing A and comprises six guides 110 as shown in detail in FIG. 8. These guides are constructed in two longitudinal parts 111 and 112 which have bases 113 and 114 overlying one another and flanges 115 and 116 extending upwardly therefrom. Issuing inwardly from the flanges 115 and 116 are inclined rails 117 and 118 along which the eggs may travel. The guides 110 rest upon and are attached to transverse frame members 121 forming therewith a single unit which may be placed upon supports 122 attached to the walls 71 of extension 32, as shown in FIG. 4. For the purpose bolts 123 are empoyed which extend through transverse slots 124 in the bases 113 and 114 of the parts 111 and 112 of guides 110. By means of this construction, the distance between the rails 93 and 94 can be varied to accommodate different sizes of egg. The guides 110 are positioned substantially the same distance apart as the eggs in the egg cases in which they are shipped and the spacing of the rods 99 on the chains 81, 82 and 83 are similarly spaced so that a layer of the eggs may be deposited as a unit, on the various guides and conveyed through the machine as will hereinafter be more fully described. When a layer of eggs is being deposited as specified the individual eggs rest on the rails 117 and 118 and fall between the rods 99. As the conveyor moves the eggs are advanced toward the egg arranging apparatus F of the machine. The arrangement of the various guides 110, is shown in FIG. 6. Due to the fact that the eggs are usually arranged thirty-six in a layer, in the ordinary egg case, six guides 110 are shown for each run B and C producing six runways 161, 162, 163, 164, 165 and 166 in the feed device for each run, however only those employed with the run B have been described in detail.

*Egg arranging apparatus F*

For the purpose of changing the position of the eggs from vertical to horizontal and increasing the spacing of the eggs to allow travel of the egg with axes of the eggs transverse, the egg arranging apparatus F, shown in FIGS. 6, 7, 8 and 9 is employed. This apparatus included a number of deflectors 141, 142 and 143. The deflectors 141 have necks 144 which are inserted into the runways, 161 and 166 formed by certain of the guides 110 and with heads 145 projecting outwardly beyond the ends of the guides 110. The necks 144 have flaps 146, FIG. 7, which overlie the bases 114 of the part 112 of guides 110 and are secured thereto by rivets 147. Following the flaps 146 are ramps 148 which lead to portions 151 of the necks parallel with the bases 113 and 114 of guides 110 and which extend outwardly from said necks and into heads 145. Toward the outer ends of the portions 151 are formed inclines 152 which incline upwardly and which merge with downwardly extending inclines 153 to form ridges 154. The ridges 154 are arranged on a skew as shown in FIG. 6. The deflectors 142 and 143 are constructed in a similar manner and the same reference numerals will be used to designate similar parts. The inclines 152 and 153 cause the eggs to be directed from the runways 161, 162, 163, 164, 165 and 166, to the corresponding runways 131, 132, 133, 134, 135 and 136. The inclines 152 of the deflectors 141 and 142 are longer than the inclines of the deflectors 143 to cause the eggs to travel a greater distance than those entering runways 163 and 164. The eggs when leaving deflectors 142 and 143 are partly guided by the adjoining deflectors to cause the eggs to reach the proper runways 131, 132, 133, 134, 135 and 136. There being no proper adjoining deflectors to cooperate with the deflectors 141, the heads 145 of these deflectors are formed with upturned flanges 155 which serve the same purpose. It will be noted that the ridges 154 of part of the deflectors skew to the right while the others skew to the left. This is for the purpose of causing the minimum lateral travel of the eggs in passing from the egg receiving device E to the runways 131, 132, 133, 134, 135 and 136. Beneath each of the deflectors 141, 142 and 143 is an upwardly inclined ramp 156 on which the eggs on leaving the deflectors are discharged. These ramps extend up to horizontal plates 157 which have disposed on them pads 158 which lie in continuation of the pads 106 resting on channel members 105. These pads form runways 471, 472, 473, 474, 475 and 476 which lie in continuation of the runways 131, 132, 133, 134, 135 and 136 formed by the pads 106. When one of the rods 99 of the conveyor D engages the eggs leaving the runways 141, 142 and 143 the same rolls the eggs up the ramps 156 and upon the pads 158. At the end of the plates 157 is provided a single plate 167 which has depending tongues 168 formed in the same and facing the spaces between plate 157. These tongues are cut out of the metal of the plate and in conjunction with the forward edge of the plate 157 form sockets 169 which the eggs drop. In leaving the ramp, the eggs are at different angles and when entering the sockets 169 the same are straightened out and arranged in transverse alignment. The rods 99 of conveyor D then progresses the eggs until they reach the runways 131, 132, 133, 134 and 135 and 136 formed between the pads 106 previously described.

*Water washing apparatus G*

The eggs on arriving in the central portion 31 of the housing A are subject to the washing and scouring action produced by the water washing apparatus G. This apparatus, FIG. 5 is disposed in the forward one half of the cover 60 of housing A immediately above conveyor D and serves both of the runs B and C of the machine. The apparatus G comprises two water conducting headers 171 and 172 which lie along the corners between the walls 61 and 62 and the top 66 of cover 60 and are supported on channels 173 secured to walls 61 and 62. These headers have connected to them a number of transverse feed pipes 174 which are formed with depending branches 175. Spray nozzles 176 are connected to these branches and spray water with detergent therein downwardly upon the eggs passing below on the supports 105 and pads 106 of both runs B and C. The nozzles 176 may be of the type used for spraying water in gardens and produces a diverging conical spray. Such construction being well known in the art has not been shown in detail. The intermediate portions of the transverse feed pipes rest upon a shelf 177 formed on the top partition 74 between runs B and C.

Figures 17, 18, 19, 20, 21:
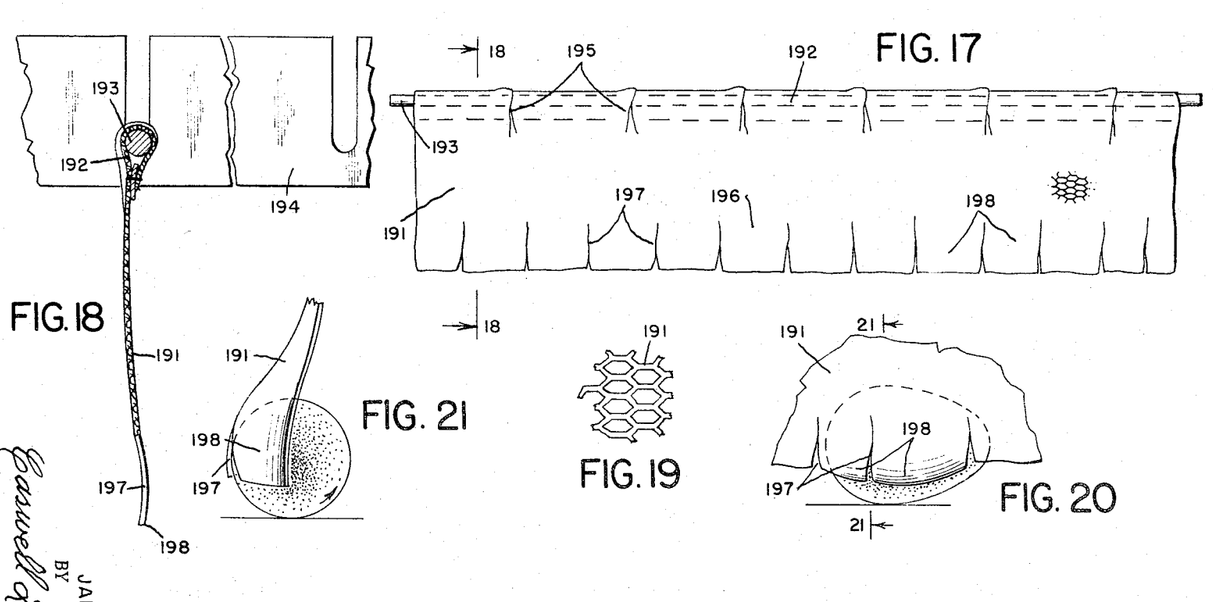
FIG. 17 is a fragmentary elevational view of one of the washing cloths of the invention drawn to a reduced size.
FIG. 18 is a cross-sectional view taken on line 18—18 of FIG. 17 and drawn to full size.
FIG. 19 is a fragmentary elevational view of a portion of one of the washing cloths shown in FIG. 17.
FIG. 20 is a fragmentary elevational view showing the manner in which the washing cloth is applied to an egg.
FIG. 21 is a cross-sectional view taken on line 21—21 of FIG. 20.
Figure 22:
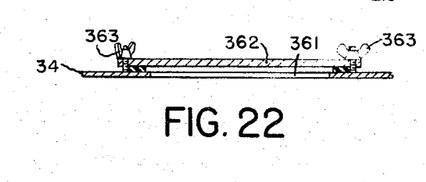
FIG. 22 is a fragmentary cross-sectional view of the observation window and closure taken on line 22—22 of FIG. 2 and drawn to a greater scale than FIG. 2.

The washing apparatus G further includes a number of washing cloths 191 which are best shown in FIGS. 5, 17, 18, 19, 20 and 21. These cloths extend across each run B and C and are spaced longitudinally at about the same spacing as the rods 99 of conveyor D. Each of these cloths has a hem 192 at the upper portion of the same and extends through a supporting rod 193. Rods 193 are supported on hangers 194 which are attached to the side walls 61 and 62 and to the partition 74 of the cover 60 for housing A. In each of the hems 192 of cloths 191 are formed a number of darts 195 which cause the material of the cloths to gather and extend about a substantial portion of the eggs as shown in FIG. 20. At the lowermost marginal portion 196 of each cloth is formed a number of slits 197 which form in the cloths flaps 198 which wrap about the eggs and which scour the eggs as they roll past the same. It has been found that a nylon net material similar to that shown in FIG. 19 gives the best results.

Water circulating means H

In the bottom of the central portion 30 of housing A, two chambers 51 and 52 are formed by partition 47 and which serve as water tanks, chamber 51 for washing water and chamber 52 for rinsing water. The headers 171 and 172 are closed at their innermost ends and the outermost ends thereof have connected to them L's 181 which terminates in short lengths of pipe 182. These pipes have attached to them short lengths of flexible hose 183. The hose 183 are further attached to vertical pipes 184 (FIG. 1) which in turn are connected to the output of two water pumps 185. The inlets of pumps 185 have connected to them short lengths of flexible hose 186 which in turn are connected to pipes 187 which extend through the wall 36 of housing A and into chamber 51 near the the bottom 42 of said housing. These pipes draw water from the tank 51 through screens 188. By applying pressure from two pumps to opposite ends of the feed pipes, more uniform pressure results and uniform spraying and washing is produced.

Water heating means I

Heating of the water is procured by means of the following construction best shown in FIGS. 2, 4 and 5. Two heating units 240 and 240A are employed, one for the washing water and one for the rinsing water. Slidably mounted in guides 48 of housing A on the plates 46 is a drawer 241 which houses the units 240 and 240A. This drawer has a bottom 242 and two upstanding side walls 243. These side walls have laterally extending lips 244 which slidably engage the guides 48. The bottom 242 is constructed with air holes 245 by means of which air is admitted into the combustion chambers 246 formed by the plates 46, and bottom 42 of the central portion of housing A and the drawer 241. Within the chamber 246 is mounted a number of gas burners 247 which are attached to the bottom 242 by bolts 248 extending through lugs 249 on said burners and said bottoms. The gas inlets to these burners are indicated by the reference numeral 251 which extend through openings 259 in the side walls 243 of drawer 241. Below the drawer 241 is a gas header 252 connected to a suitable source of gas under pressure and having two sections 214 and 214A. These sections feed gas to the burners in the two units 240 and 240A respectively. In these two sections of the header 252 are solenoid operated valves 215 and 215A, FIGURE 23, and which have solenoids 421 and 421A for operating the same. Tubes 253 are connected to this header and to the inlets 251 and furnish the fuel for said burners. The flames from the burners 247 extend upwardly and strike the bottom 42 of the housing A and heat the water in the tanks 51 and 52. Temperature controlled switches 217 and 218, subject to the temperature of the water in the two tanks 51 and 52 maintains the water at the proper temperature for use. Associated with these switches are float operated switches 284 and 285 which operate in series with switches 217 and 218 to shut off the heat when the water gets too low.

Mixing apparatus J

Figure 16:
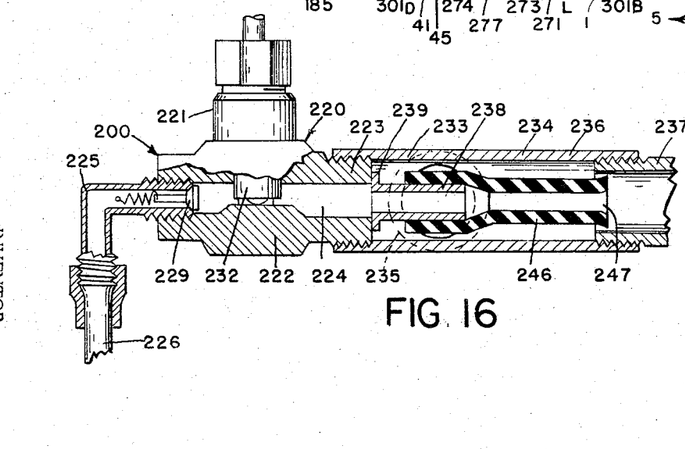
FIG. 16 is a longitudinal sectional view of the mixing device taken on line 16—16 of FIG. 1.

The water used for both washing and rinsing is treated by adding a detergent thereto which is accomplished by two mixing units 200 and 200A best shown in FIGS. 1 and 16. The unit 200 is used for the washing water and the unit 200A is used for the rinsing water. Both units being identical only the unit 200 will be described in detail and the similar parts in unit 200A indicated by the same reference numerals. Fresh water is introduced in the system from a pipe 202 connected to a suitable water supply. This pipe is connected to a shutoff valve 203 used for turning the water on and off. A pipe 204 connects the valve 203 with a valve 205 which in turn is connected to a T 206. A line 207 serving the washing apparatus G and a line 208 servicing the rinsing apparatus H is connected to T 206. In the line 207 is connected an electric operated shut-off valve 211. This valve is in turn operated by a time clock 212 so that fresh water may be added at predetermined intervals. The line 207 has mounted in it a pressure gauge 213 and is connected to a mixing device 220 shown in detail in FIG. 15.

Figure 12:
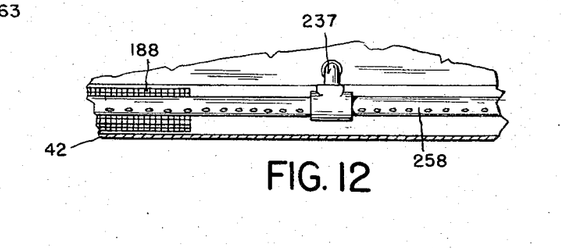
FIG. 12 is a fragmentary sectional view taken on line 12—12 of FIG. 5 and illustrating the means for discharging water into the water receptacle.

The mixing device 220 comprises a valve 221 which has a body 222 formed with a threaded boss 223. Formed in the body 222 is a runway 224 which extends through boss 223 and communicates with an L 225 screwed into said body. The L 225 has a flexible tube 226 attached to it and which extends through the cap 227 of a bottle 228 containing the detergent in liquid form and down toward the bottom thereof. The bottle 228 rests upon a shelf 231 which is attached to the wall 34 of housing A. The valve 221 is provided with a manually operated threaded valve member 232 which extends across the runway 224 and which when operated controls the amount of detergent passing through said runway. Screwed on the boss 223 is one branch 233 of a T 234, the other branch 235 thereof being connected to the end of the line 207. The other branch 236 of the T 234 is connected to a pipe 237. Within the T 234 is a nipple 238 which has a flange 239 soldered to the end of the boss 223. This nipple has mounted on it a short flexible tube 246 whose outer end 247 is flared and fits into one end of pipe 237. This construction forms a venturi-tube and when water passes through the T 234 detergent is drawn from bottle 228 mixed with the water and the mixture discharged into pipe 237. The valve 221 controls the concentration of the mixture. A check valve 229 prevents flow of water into the bottle 228. The pipe 237 of the mixing device 220 passes through the wall (34) of housing A and into the chamber 51 of said housing near the bottom 42 thereof. Secured to the end of this pipe is an elongated spray nozzle 258, FIG. 12, which discharges the detergent and water mixture along an appreciable length of the chamber 51 and transversely thereof. This stirs up the sediment collecting at the bottom of the tank and brings it to the surface of the water and from which it may be drained away as will be presently described.

Rinsing apparatus K

The rinsing apparatus K is almost identical with the washing apparatus. The conveyor D serves the rinsing apparatus as well as the washing apparatus, the eggs traveling continuously from the one apparatus to the other. The cloths in the rinsing apparatus and the sprays also act in the same manner. The principal difference, however, resides in that cleaner water is used in the rinsing apparatus than in the washing apparatus. Due to the similarity of the parts, the description thereof will not be repeated but the same reference numerals used to indicate the corresponding parts.

Drainage apparatus L

Dirty water is removed from the machine in the following manner as shown in FIG. 4. The two chambers 51 and 52 are separate and have the partition 47 as a common dividing wall. In the chamber 51 is mounted a drain pipe 271 which extends through the bottom 42 of housing A and discharges into a screen basket 272 mounted below the bottom 242 of drawer 241. This basket is disposed in a receptacle 273 which has connected to it a sewer pipe 274 leading to the sewer or to any other place where the dirty water is to be discharged. In the partition 47 is formed an opening 48 which forms on the partition an upper edge 49. FIG. 5, determining the height of the water in the chamber 52. The upper end 276 of the drain pipe 271 is situated below the edge 49 so that the water in chamber 51 starts to drain when the water reaches the top of the same. A cap 275 is spaced from and overlying the upper end 276 of drain pipe 271 serves to prevent extraneous matter from entering said pipe. A drain pipe 277 for chamber 52 is provided which discharges into basket 272. This drain pipe terminates immediately above the bottom 42 of housing A and has a stopper 281 therein for closing the same. The drain pipe 271 has a branch 282 at the lower end of the same which is similarly provided with a stopper 283. The drain pipe 277 and branch 282 are used when the water in the chambers 51 and 52 is to be completely drained out. If for any reason the water in the chambers 51 and 52 drops below a certain level the two float switches 284 and 285 are provided whose floats 286 are disposed at such level and which shut off the heat, thereby protecting the tanks.

*Drying apparatus M*

The drying apparatus M best shown in FIGS. 1, 2, 3 and 4 utilizes a large fan 261 which is mounted in a case 262 attached to one of the walls 71 of extensions 33. This case has a left side wall 263, a right side wall 264 and a wall structure 265 connecting the two side walls 263 and 264 together. The wall 263 is open at the lower end of the same and a duct 266 encloses the open end of case 262 and communicates with the interior of said case and directs air into the case 262 at the inlet side of the fan 261. An opening 267 in the wall 71 of extension 33 brings the duct 266 into communication with the interior of the extension 33. Air is drawn by fan 261 through the spaces 107 between pads 106 of guide means Q at extension 33 and about the eggs carried by said guide means on said pads. Air is also conducted from a duct 268 which extends through the bottom 72 of extension 33 and whose inlet collects heated air escaping from the central portion of housing A. This air is discharged into the interior of extension 33 and from which it is picked up by fan 261. This fan discharges the air through a duct 269 attached to the wall 264 of case 262.

*Discharge device N*

Figures 13, 14, 15:
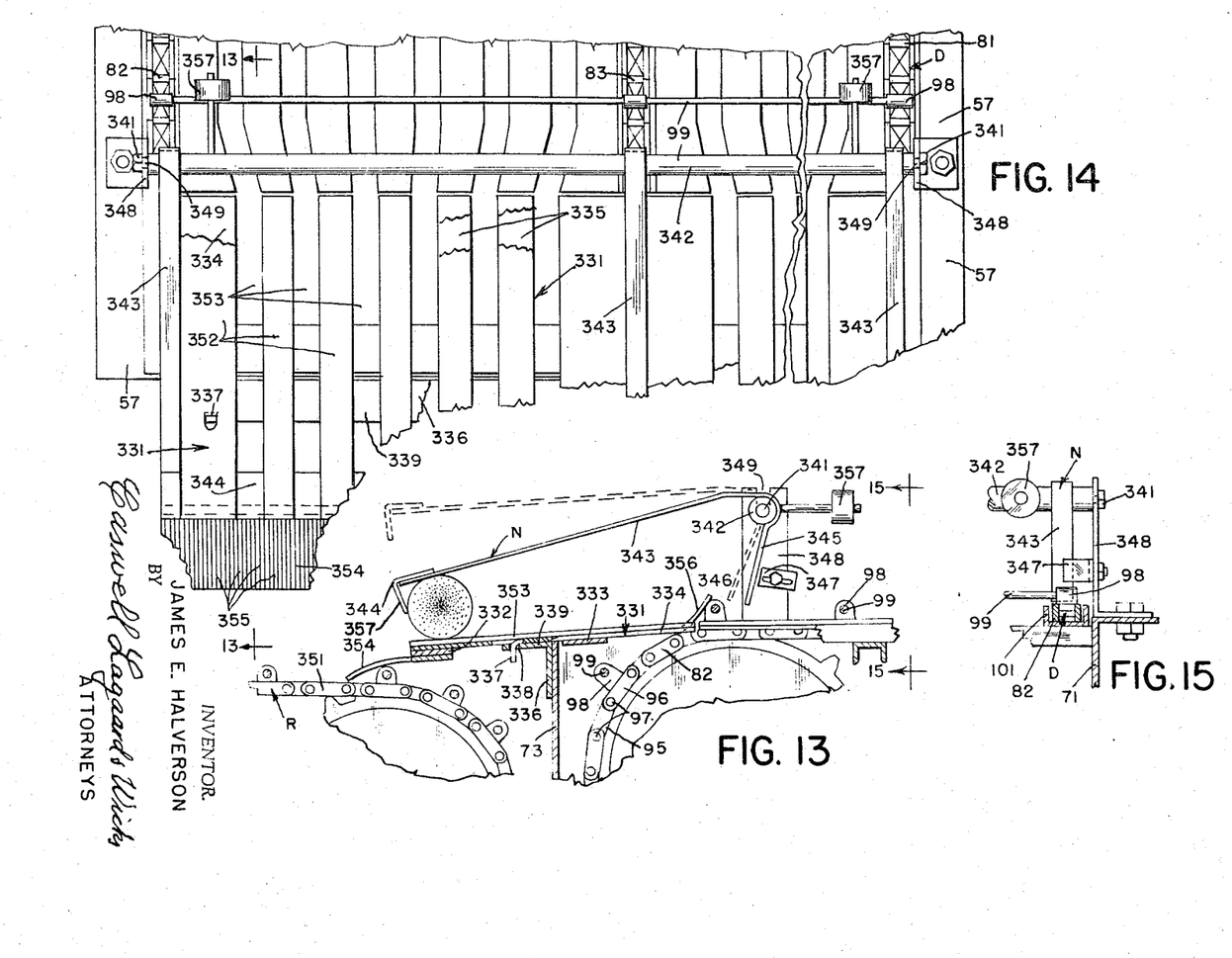
FIG. 13 is a longitudinal sectional view of the discharge device of the invention taken on line 13—13 of FIG. 3 and drawn to a greater scale.
FIG. 14 is a plan view of the structure shown in FIG. 13.
FIG. 15 is a cross sectional view taken on line 15—15 of FIG. 13.

The discharge device N is best shown in FIGS. 13, 14 and 15 and is disposed at the end of the extension 33 of housing A. This device comprises a swinging incline 331. This incline includes two transverse cross bars 332 and 333 across which extend a number of longitudinal rails 334 and 335, which are secured thereto. The incline 331 is supported on an angle bracket 336 which is attached to the upper end of the end wall 73 of extension 33 of housing A. Fingers 337 on the outer ends of rails 334 depend therefrom and are received in holes 338 in the upper flange 339 of the bracket 336. By means of this construction hinge means are provided between the incline 331 and rail bracket whereby the forward end of said incline may swing upwardly to a small degree for a purpose to be presently described. Rubber pads 352 are attached to the rails 334 and 335 and form runways 353 similar to the runways 131, 132, etc., between channel members 105. These runways are, however, the same distance apart as the runways 161, 162, etc., between the guides 110. The ends of the channels 105 and the rubber pads 106 converge to direct the eggs into the runways 353.

Attached to the ends of the flanges 57 of housing A are two uprights 348. These uprights have vertical notches 349 in the upper ends of the same which receive the shanks of cap screws 341 screwed into the ends of a shaft 342 and which is supported for swinging movement thereby. Welded to the shaft 342 are three arms 343 disposed adjacent uprights 348 and above chains 81, 82 and 83 and which incline downwardly from said shaft, Attached to the lower ends of said arms is an angle member 344 the lower leg 357 of which is normally disposed in the path of travel of the eggs rolling along the runways 353. Integral with the outmost of the arms 343 and extending downwardly from the shaft 342 are arms 345 whose lower ends 346 lie in the path of movement of the lugs 98 on chains 81 and 82. Adjustable stops 347 attached one to each of the uprights 338 engage the arms 345 and limit the downward movement of the angle member 344 to just hold the eggs resting against the leg 357 of the same from further movement. When the lugs 98 of chains 81 and 82 engage the lower ends 346 of arms 345, said arms are swung in a clockwise direction as viewed in FIG. 13 which raises the angle members 344 and releases the row of eggs resting against the same.

In the use of the instant invention the machine delivers the eggs to an accompanying candling and grading machine which in turn discharges the eggs into the desired egg cases. Such machines being well known in the art and forming no particular feature of the invention has not been disclosed in its entirety in this application. Such a machine utilizes a conveyor similar to that shown in this application, a portion of which is shown in FIG. 13 and indicated by the reference character R. This conveyor is situated so that the upper run 351 thereof at its intake end lies beneath the lower edge of the cross bar 332. A buffer element 354 is secured to the under side of cross bar 332 and has a plurality of flexible fingers 355 extending outwardly therefrom and deposits the eggs on the conveyor R of the candling and grading machine without injury to the eggs.

Since the runways 353 lie in continuation of the runways 131, 132, 133, 134, 135 and 136, the incline 331 is hinged to swing upwardly at the discharge ends of the upper runs 93 of chains 81, 82 and 83 to allow the rods 99 in the upper runs 93 to descend to the lower runs 94, For the purpose cams 356 formed on the rails 334 are employed which are engaged by the lugs 98 on chains 81 and 82 which lift the incline 331 and allow said rods to pass underneath.

*Transmisisons O*

The various rotating parts of the invention are driven in the following manner: Each of the pumps 185 is driven by separate motors 301A, 301B, 301C and 301D, each of which drives a speed reducer 302 connected to the shaft of the pump.

The conveyor D is driven by a motor 303, FIG. 2, which drives a speed reducer 304. The motor 303 is carried by this speed reducer. Speed reducer 304 is supported on a platform 305 which is hinged at 306 to two legs 307 attached to and depending from the extension 33 of housing A. Two adjustable braces 208 in the form of turnbuckles are pivoted at their upper ends to platform 305 and at their lower ends to the lower ends of the legs 307. The speed reducer 304 has an output shaft 311 on which is mounted a pulley 312. A belt 313 passes over this pulley and another pulley 314 mounted on the conveyor shaft 87.

Figure 3:
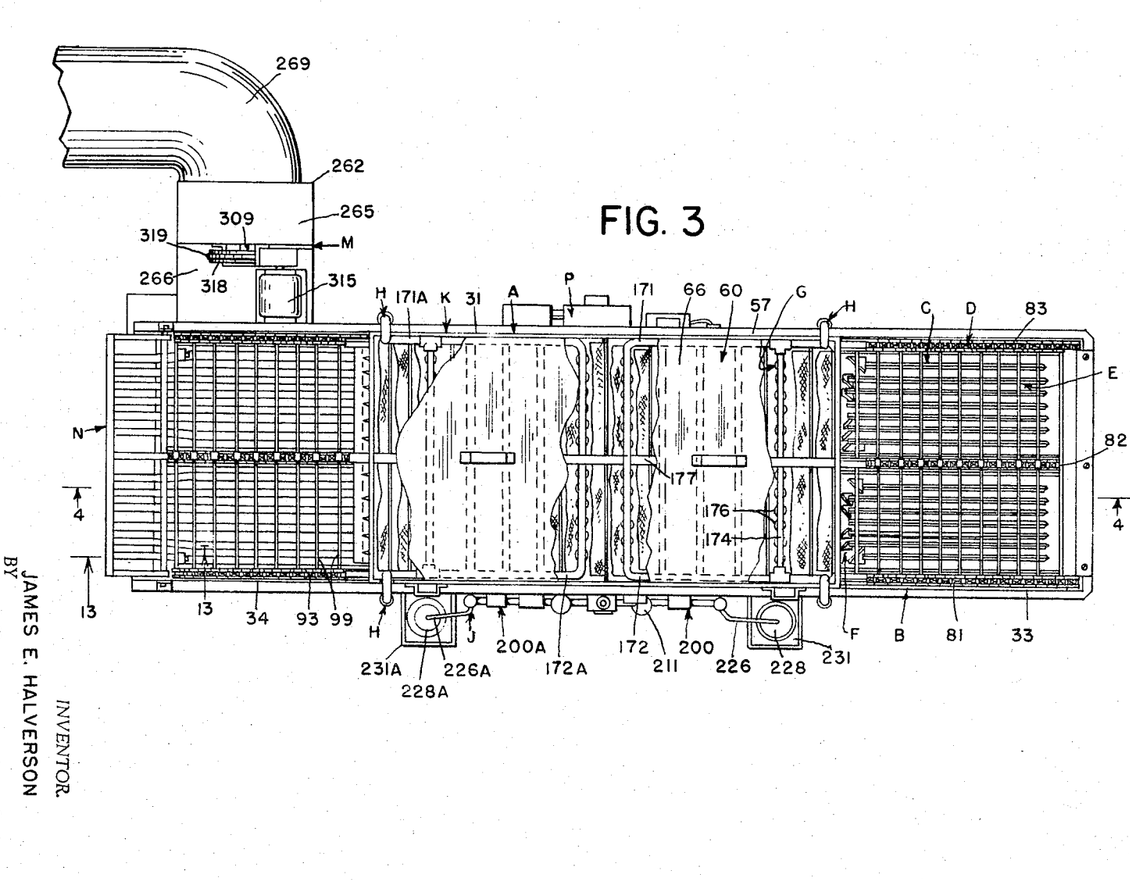
FIG. 3 is a plan view of the machine with portions cut away to illustrate the structure within the machine.

The fan 261 is driven by a motor 315 mounted on the duct 266 as best shown in FIGS. 1 and 3. This motor has an armature shaft 316 carrying a pulley 317. The fan 216 is mounted on a shaft 309 which has attached to it another pulley 318. A belt 319 passes over the pulleys 317 and 318 and drives the fan 261. Protecting the belt 319 is a guard 299 which is attached to the wall 263 of case 262.

*Electrical system P*

Figure 23:
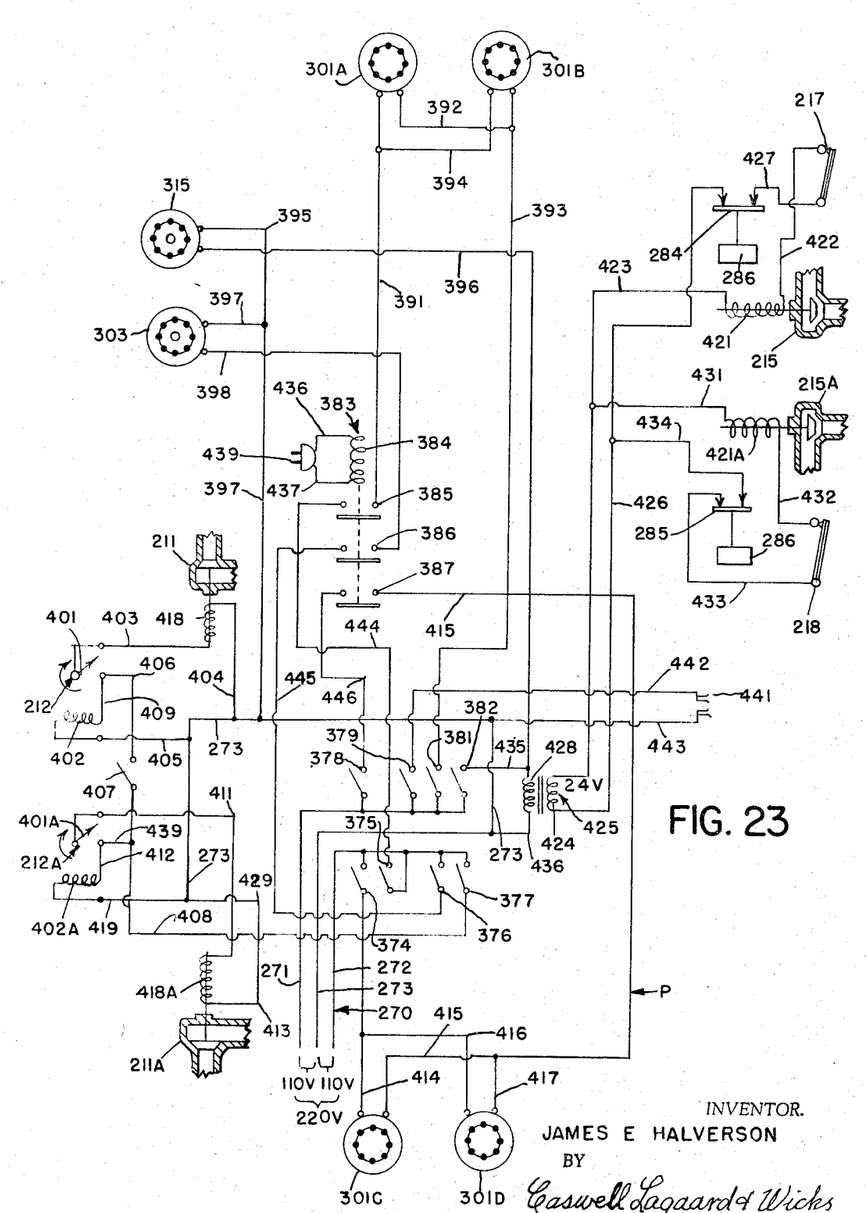
FIG. 23 is a wiring diagram of the invention.

A wiring diagram of the electrical system P appears in FIG. 23. Current for operating the various apparatus is derived from a three-wire power line 270 having conductors 271, 272 and 273. The voltage between the conductors 271 and 273 and between conductors 272 and 273 is 110 volts and between conductors 271 and 272 is 220 volts.

For operating the various parts of the system, eight manually controlled switches, 374, 375, 376, 377, 378, 379, 381, and 382 are employed. In addition, one gang switch, 383, is employed, which is operated by a solenoid 384. This switch includes three individual switches, 385, 386, and 387. One side of each of the switches 374, 375, 376, and 377, are connected to the conductor 272. One side of each of the switches 378, 379, 381 and 382 are connected to the conductor 271. The motor 301A is connected by means of a conductor 391 to one side of the switch 385. The motor 301B is connected by means of a conductor 393 to the other side of switch 381. A conductor 392 is connected to the conductor 393 and to the other terminal of motor 301A. A conductor 394 connects conductor 391 with the other terminal of motor 301B. Motor 315 is connected at one terminal by means of a conductor 395 to conductor 273. The other terminal of this motor is connected by a conductor 396 to the other side of switch 382. In a similar manner, motor 303 is connected by a conductor 397 to conductor 395, while the other terminal of motor 303 is connected by a conductor 398 with one side of the switch 386.

The time clock 212 has a switch 401, which is operated by the movement of the clock and a motor 402, which drives the clock movement. Valve 211 has a solenoid 418. One end of solenoid 418 is connected by means of a conductor 403 with switch 401. The other end of this solenoid is connected by a conductor 404 with the conductor 273. The motor 402 of clock 212 is connected by a conductor 405 to the conductor 273. The switch 401 is further connected by means of a conductor 406 to one side of a switch 407. The other side of this switch is connected by a conductor 408 to the other side of switch 377. The other side of motor 202 is connected by a conductor 409 to conductor 406.

The time clock 212A has a switch 401A corresponding with switch 401 of clock 212 and a motor 402 similar to motor 402.

Valve 211A has a solenoid 418A. One end of this solenoid is connected by means of a conductor 429 to the conductor 273. The other end of said solenoid is connected by means of a conductor 411 to the switch 401A. The switch 401A is further connected by means of a conductor 439 to conductor 408. One terminal of motor 402A is connected by means of a conductor 419 and conductor 273. The other terminal of motor 402A is connected by a conductor 412 to the conductor 408.

Motor 301C is connected by means of a conductor 414 to the other side of switch 374. The other side of motor 301C is connected by means of a conductor 415 to one side of switch 387. One side of motor 301D is connected by means of a conductor 416 to conductor 414, and the other side of this motor is connected by means of a conductor 417 to conductor 415. For operating the solenoids, 421 and 421A, a step down voltage transformer 424 is employed. This transformer has a primary 428 and a secondary 425. The primary 428 is connected by a conductor 435 to the conductor 396 and by means of a conductor 436 to the conductor 273.

Solenoid 421 is connected at one end by means of a conductor 422 to the heat sensitive switch 217 and is further connected by a conductor 423 to one terminal of the secondary 425 of the step down transformer 424. The other terminal of the secondary of this transformer is connected by means of a conductor 426 to one of the contacts of the float switch 284. The other contact of this switch is connected by means of a conductor 427 to the other contact of the switch 217. In a similar manner, one end of the solenoid 421A is connected by means of a conductor 431 to the conductor 423 and the other end is connected by means of a conductor 432 to one contact of heat sensitive switch 218. The other contact of this switch is connected by means of a conductor 433 to one contact of float switch 285, the other contact of which is connected by means of a conductor 434 to conductor 426. Thus the two switches 284 and 217 are connected in series and likewise the switches 285 and 218. When these switches are closed valves 215 and 215A are open and gas is delivered to the two heater units 240 and 240A. Where either of the switches 284 or 217 of unit 240 are opened due to too low water level or too high temperature, gas is cut off from the feeder section 214 and the burner unit 240 shut off. The same occurs in connection with the burner unit 240A.

The solenoid 384 is connected to a line 436–437 which is connected to a plug 439. This plug is connected in the circuit energizing the candling and grading machine R and is normally disconnected until the machine R is functioning and ready to receive eggs from the discharge device N of the instant invention. The other side of the switch 385 is connected by means of a conductor 444 to the other side of switch 375. The other side of switch 386 is connected by a conductor 445 to the other side of switch 376. The other side of switch 387 is connected by means of a conductor 446 to the other side of switch 378.

For the purpose of energizing a trouble shooting device or an inspection lamp a socket 441 is employed which is connected to a flexible cord comprising two conductors 442 and 443. The conductor 442 is connected to the other contact of switch 379 and conductor 443 connected to conductor 273.

*Method of operation*

The method of operation of the invention is as follows:

In starting the machine, the water is turned on by opening valves 203 and 205 and filling the tanks. Detergent is then added. The time clocks 212 and 212A are set to control valves 211 and 211A to give the desired interval between the injection of detergent into the water and switch 377 is now closed. Switch 382 controlling the operation of the fan motor 315 is now closed completing a circuit including conductor 273, conductor 395, motor 315, conductor 396, switch 382 and conductor 271. This sets fan 261 into motion and air is drawn through the conveyor D and the fumes from the gas burners 247 removed by the duct 268. The exhaust from the fan 261 is discharged out of the building by means of duct 269. The circuit through the primary 428 of the transformer 224 being controlled by the switch 382 which controls the gas valves 215 and 215A is also closed. This circuit includes the secondary 425 of said transformer, conductor 423, solenoid 421, conductor 422, switch 217, conductor 427, switch 284 and conductor 426 back to the secondary 425 of transformer 424. The same is true with the circuit controlling valve 215A. The water being under the required temperature switches 217 and 217A are closed and the valves 215 and 215A are open providing gas for the burners 247.

The rest of the equipment is controlled by the gang switch 383. This switch is normally open and the pump motors 301A, 301B, 301C and 301D deenergized. Plug 439 when the water is at the right temperature and the candling machine R properly running is plugged into the line operating said machine which closes switch 383. Switches 375 and 381 are next closed, completing a circuit from conductor 272 of line 270, through switch 375, conductor 444, switch 385, conductor 391, motor 301A, conductor 393, switch 381 to the conductor 271 of line 270. This energizes motor 301A with 220 volts alternating current. Motor 301B being connected in parallel with motor 301A is also energized. The water in the washing apparatus is now being circulated and drawn from tank 51 through water inlets 188 through pipes 187 and 186 through the pumps 185 pipes 184 and headers 171 and 172. The water then flows through feed pipes 174, branches 175 and the nozzles 176 discharging the water in the form of conical sprays over the eggs progressed by conveyor D. The water being discharged in sprays strike the wash cloths 191 forcing them against the eggs and causing the same to wrap about the eggs and to scour the eggs as they pass said cloths. Due to the slots 197 in these cloths and due to the darts 195 the cloths wrap around the ends of the eggs and thoroughly clean the same.

Switches 374 and 378 are next closed. This completes a circuit from conductor 272 of line 270, through switch 374, conductor 414, motor 301C, conductor 415, switch 387, conductor 446, and switch 378 back to the conductor 271 of said line. Motor 301D being connected in parallel with motor 301C, both of these motors are energized and water is circulated in the rinsing apparatus K, the same as in the washing apparatus G.

On closing gang switch 383 and switch 376 a circuit is established from conductor 272 of line 270, through switch 376, conductor 445, switch 386, conductor 398, motor 303, conductor 397 and to conductor 273 of line 270. The conveyor D is now operated.

The supply bottles 278 are at all times maintained with detergent in them. Clocks 212 and 212A are set to operate for predetermined lengths of time at certain intervals. Throughout the operation of the machine the clocks run continuously. The circuit for the clocks are energized by closing switch 377, which is connected to conductor 272 of switch 270. The circuit for energizing clock 212A starts with switch 377 and continues through conductor 408, conductor 439, the conductor 412, the motor 402A of said clock and conductor 419 to the conductor 273 of said line 270. Switch 407 is employed to disconnect clock 212 in the event that the clocks happen to function at the same time so as to let clock 212A get ahead of clock 212. The switch 377 controls the energization of the control circuit of both clocks 212 and 212A. Where switch 377 is closed a circuit is established from the conductor 272 through switch 377, conductor 408, conductor 439, clock switch 401A, conductor 411, solenoid 418A, and conductor 413 to conductor 273 of line 270. This opens valve 211A and permits the mixing unit 201A to function. Travel of water through the branch 233 of T 234 and pipe 237 causes injection of the detergent into the nozzle 258. The mixture is directed along the bottom 42 of housing A transversely thereof. This causes any sediment collected on the bottom to be washed up and discharged through the drain pipe 276 to the sewer. The rinsing unit is now in operation.

Simultaneously with the operation of the rinsing apparatus switch 337 controls the operation of solenoid 418 and valve 211, controlling the passage of water and detergent mixture to the washing apparatus G. The eggs may now be removed, a layer at the time from the egg cases by means of suction apparatus now in common use but not shown and deposited upon feed device E with the longitudinal axes of the eggs vertical. As they travel along, the egg arranging device F rearranges the eggs so that the longitudinal axes thereof are horizontal and at right angles to the direction of travel of conveyor D. The eggs pushed by the rods 99 of conveyor D which engage the eggs behind and at or below the axes of the eggs causes the eggs to roll along the edges of the pads 106 which serve as rails forming runways along which the eggs travel. As the eggs pass through the central portion 30 of housing A the same are first scrubbed and washed by the washing apparatus G and then rinsed and further scrubbed by the rinsing apparatus K. On leaving the central portion 30 of housing A the eggs travel in the open. Here the current of air produced by fan 261 passes through the spaces between the rails 105 and pads 10 and about the eggs carried thereby, thus drying the eggs and is discharged through duct 269 outwardly into the exterior of the building in which the machine is installed. This fan removes the moisture laden air and odor from the eggs and the exhaust fumes from the gas burners and discharges the same out of the building preventing the air within the building from becoming foul.

The advantages of the invention are manifest. Eggs can be handled by the machine with practically no breakage. Thorough cleaning is procured at the ends of the eggs as well as about the intermediate portions. This is accomplished by the use of the nylon netting employed in the construction of the washing cloths and by the slits and darts formed in the same. The eggs roll along the guideway while engaged by the washing cloths thereby insuring thorough cleansing throughout the circumferential extent thereof. The water used in both the washing and rinsing apparatus is being continually changed at spaced intervals so as to prevent excessive contamination of the same. The fan blowing air from the room in which the machine is situated and through the machine removes odors and moist air from the room, making the room and machine highly sanitary. The machine has a large capacity for its size and the eggs can be run through the machine at a fast rate of speed. The top of the machine and parts carried thereby can be easily detached and removed to give access to the working parts of the machine mounted in the housing A and the extensions 31 and 32 thereof. The machine is fully automatic and will operate continuously without undue attention. The machine can be built at a cost less than the cost of similar machines now on the market and will require a minimum amount of maintenance.

Changes in the form of the invention as herein described may be made within the scope of what is claimed without departing from the spirit of the invention.

Having described the invention what is claimed as new and desired to be protected by Letters Patent is:

I claim:

1. An egg cleaning machine comprising:
   (a) elongated supporting means,
   (b) elongated guide means mounted on said supporting means intermediate the ends thereof and supporting the eggs with their axes horizontal and extending transversely of the supporting means,
   (c) an egg receiving device at the front end of said supporting means, including:
   (d) elongated guide means for receiving the eggs with their axes vertical,
   (e) elongated guide means at the rear end of said supporting means,
   (f) an arranging device between said first and second named guide means serving to move the eggs from vertical position on said second named guide means to horizontal positions on said first named guide means,
   (g) a conveyor supported on said supporting means and extending along all of said guide means and said arranging device,
   (h) egg engaging members movable with said conveyor and causing the eggs to move in a longitudinal direction along said guide means,
   (i) water washing apparatus above the forward portion of said first named guide means and washing the eggs passing therebeneath,
   (j) rinsing apparatus disposed above the rearward end of said first named guide means and rinsing the eggs passing therebeneath,
   (k) mixing apparatus for mixing detergent with the water used,
   (l) drying apparatus following the rinsing apparatus and drying the eggs in passing along said third named guide means and,
   (m) a discharge device at the end of said conveyor for discharging the clean eggs from the machine.

2. An egg cleaning machine in accordance with claim 1 in which the first named guide means includes:
   (a) spaced guide members provided with spaces therebetween of lesser width than the length of the eggs and through which the dirty washing water passes.

3. An egg cleaning machine in accordance with claim 2 in which:
 (a) the guide members have facings constructed of compressible friction material such as rubber for frictionally engaging the eggs to keep the axes of the egg transverse of the guide means.

4. An egg cleaning machine in accordance with claim 3 in which the egg arranging device utilizes:
 (a) diverging deflectors for shifting the eggs from the egg receiving device to the guide means.

5. An egg cleaning device in accordance with claim 1 in which the egg engaging means:
 (a) engages the eggs at such localities as to cause the eggs to roll as they travel along the first named guide means.

6. An egg cleaning machine in accordance with claim 5 in which the first named guide means includes:
 (a) guide members provided with spaces therebetween of lesser width than the length of the eggs and through which the dirty waste water passes and are formed from inverted channels and
 (b) the facings are strips of compressible friction material such as rubber cemented to the webs of the channels.

7. An egg cleaning machine in accordance with claim 1 in which the conveyor comprises:
 (a) side chains across which rods extend, engaging the eggs at localities substantially at a height above the bottom thereof equal to the maximum radius of the eggs and at localities therebelow.

8. An egg cleaning machine in accordance with claim 1 in which the supporting means comprises a housing having:
 (a) a lower section formed with
 (b) a central portion,
 (c) a front extension,
 (d) a rear extension and
 (e) a cover covering the central portion.

9. An egg cleaning machine in accordance with claim 8 in which:
 (a) the egg receiving device and arranging device are disposed in the front extension,
 (b) the washing apparatus is disposed in the front end of the central portion and cover,
 (c) the rinsing apparatus is disposed in the rear end of the central section and cover and
 (d) the drying apparatus is associated with the rear extension.

10. An egg cleaning machine in accordance with claim 9 in which the arranging means includes:
 (a) tongues in the spaces between the guide members disposed slightly above the lower portions of the eggs when they roll along said guide means and causing the eggs to raise and assume positions at right angles to the direction of travel of the eggs.

11. An egg cleaning machine in accordance with claim 8 in which the conveyor
 (a) conveys the eggs from the egg receiving device through the egg arranging device, along the three guide means, through the washing apparatus, through the rinsing apparatus, through the drying apparatus, and delivers them to the discharge device.

12. An egg cleaning apparatus in accordance with claim 8 in which the drying means utilizes:
 (a) a suction fan having its intake connected to a chamber formed within the rear extension of the housing and below the guide lower section of the housing and below the guide means supported thereby, and in which;
 (b) the guide means in the rear extension has openings in the same in which air may flow around the eggs and into chamber in said extension and be drawn by the fan and discharged exteriorly of the machine.

13. An egg cleaning machine in accordance with claim 1 in which the washing means includes:
 (a) a tank mounted in said supporting means below said water washing device, and
 (b) water circulating means connected to said tank.

14. An egg cleaning machine in accordance with claim 1 in which the washing apparatus includes
 (a) wash cloths in the form of wipers hanging vertically in the path of movement of the eggs and scrubbing the eggs as they pass thereby.

15. An egg cleaning machine in accordance with claim 14 in which the wash cloths have
 (a) darts in the upper marginal portions of the same and
 (b) slits in the lower marginal portions of the same whereby the cloths hug the eggs and fit about the ends of the same.

16. An egg cleaning machine in accordance with claim 14 in which the egg washing apparatus comprises
 (a) nozzles disposed in the cover and direct sprays of water downwardly upon the wash cloth and eggs passing through the washing apparatus.

17. An egg cleaning device in accordance with claim 16 in which the water used in the washing apparatus is:
 (a) recirculated by water circulating means from the water tank and to the nozzles.

18. An egg cleaning machine in accordance with claim 17 in which the water circulating means includes:
 (a) feed pipes extending transversely of the cover and to which the nozzles are attached
 (b) headers at both sides of the cover, said headers being connected to opposite ends of the feed pipes and
 (c) separate pumps drawing water from said tank and each discharging into one header.

19. An egg cleaning machine in accordance with claim 1, in which the rinsing apparatus comprises:
 (a) a separate tank
 (b) nozzles
 (c) a recirculating system
 (d) wash cloths and
 (e) separate pumps for the feed pipes, all similar to those employed for the washing apparatus.

20. An egg cleaning machine in accordance with claim 19 in which the water received in the rinsing tank is:
 (a) discharged from the upper portion of the rinsing tank and into the washing tank and
 (b) the water from the washing tank is discharged from the upper portion of the washing tank.

References Cited

UNITED STATES PATENTS

| | | | |
|---|---|---|---|
| 2,135,778 | 11/1938 | Wyland | 198—24 X |
| 2,136,118 | 11/1938 | Palmer | 15—3.14 X |
| 3,097,382 | 7/1963 | Angle | 15—3.13 |
| 3,099,848 | 8/1963 | Mountz | 15—3.14 |
| 3,155,102 | 11/1964 | Niederer et al. | 15—3.13 X |
| 3,252,607 | 5/1966 | Rose et al. | 15—3.13 X |

CHARLES A. WILLMUTH, *Primary Examiner.*

E. L. ROBERTS, *Assistant Examiner.*